US010462371B2

(12) United States Patent
Oka

(10) Patent No.: US 10,462,371 B2
(45) Date of Patent: Oct. 29, 2019

(54) IMAGING APPARATUS AND IMAGING METHOD FOR COMPARING A TEMPLATE IMAGE WITH A MONITORING IMAGE

(71) Applicant: Koji Oka, Kanagawa (JP)

(72) Inventor: Koji Oka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/821,930

(22) Filed: Aug. 10, 2015

(65) Prior Publication Data

US 2016/0057357 A1 Feb. 25, 2016

(30) Foreign Application Priority Data

Aug. 22, 2014 (JP) .................. 2014-169658

(51) Int. Cl.
H04N 5/222 (2006.01)
H04N 5/232 (2006.01)
G06K 9/62 (2006.01)
H04N 5/262 (2006.01)
H04N 5/77 (2006.01)
H04N 5/907 (2006.01)
H04N 9/804 (2006.01)
H04N 1/21 (2006.01)

(52) U.S. Cl.
CPC ....... H04N 5/23293 (2013.01); G06K 9/6202 (2013.01); H04N 5/23216 (2013.01); H04N 5/23222 (2013.01); H04N 5/23245 (2013.01); H04N 5/2621 (2013.01); H04N 5/772 (2013.01); H04N 5/907 (2013.01); H04N 9/8047 (2013.01); H04N 1/2137 (2013.01)

(58) Field of Classification Search
CPC .......... G06K 9/00234; G06K 9/00261; H04N 5/23293; H04N 5/23238; H04N 5/2621; H04N 5/272
See application file for complete search history.

(56) References Cited

U.S. PATENT DOCUMENTS 5,521,335 A 5/1996 Oka
5,745,688 A 4/1998 Oka
(Continued)

FOREIGN PATENT DOCUMENTS

EP 0 935 878 A1 8/1999
JP 2003-333379 A 11/2003
(Continued)

OTHER PUBLICATIONS

European Search Report dated Jan. 19, 2016 in Patent Application No. 15181260.9.
(Continued)

Primary Examiner — Sinh Tran
Assistant Examiner — Selam T Gebriel
(74) Attorney, Agent, or Firm — Oblon, McClelland, Maier & Neustadt, L.L.P.

(57) ABSTRACT

An imaging apparatus that records a subject image shot by an imaging device in a recording medium as image data, the apparatus includes a display that displays the image data and a selector that selects predetermined image data from the recording medium, wherein the display displays an image corresponding to the image data selected by the selector and a subject image in monitoring.

15 Claims, 11 Drawing Sheets

(56) References Cited

U.S. PATENT DOCUMENTS

| | | | |
|---|---|---|---|
| 5,760,345 A | 6/1998 | Oka | |
| 6,067,114 A | 5/2000 | Omata et al. | |
| 7,414,658 B2 | 8/2008 | Ariga | |
| 7,573,601 B2 | 8/2009 | Shirakawa et al. | |
| 7,656,429 B2 | 2/2010 | Larson | |
| 2003/0234877 A1 | 12/2003 | Kanehiro et al. | |
| 2004/0125214 A1 | 7/2004 | Oka et al. | |
| 2005/0012828 A1 | 1/2005 | Oka | |
| 2005/0168594 A1* | 8/2005 | Larson | G06T 3/4038 348/222.1 |
| 2005/0264668 A1* | 12/2005 | Miyamoto | H04N 5/23293 348/333.11 |
| 2006/0098112 A1* | 5/2006 | Kelly | H04N 5/23222 348/333.12 |
| 2006/0197976 A1 | 9/2006 | Oka | |
| 2007/0030512 A1 | 2/2007 | Oka | |
| 2008/0088718 A1* | 4/2008 | Cazier | H04N 5/272 348/239 |
| 2008/0129842 A1* | 6/2008 | Shibutani | H04N 1/00183 348/231.99 |
| 2009/0015702 A1 | 1/2009 | Garcia Alonso | |
| 2009/0160964 A1* | 6/2009 | Tsai | H04N 5/232 348/220.1 |
| 2010/0100628 A1 | 4/2010 | Oka | |
| 2010/0157128 A1* | 6/2010 | Choi | H04N 5/23248 348/333.03 |
| 2011/0145804 A1 | 6/2011 | Oka | |
| 2012/0044402 A1 | 2/2012 | Yamaguchi et al. | |
| 2012/0212648 A1 | 8/2012 | Oka | |
| 2013/0120613 A1 | 5/2013 | Nitta | |
| 2013/0202154 A1 | 8/2013 | Hirano | |
| 2013/0293746 A1* | 11/2013 | Iki | H04N 5/23293 348/239 |
| 2014/0226052 A1* | 8/2014 | Kang | H04N 5/23222 348/333.02 |

FOREIGN PATENT DOCUMENTS

| | | |
|---|---|---|
| JP | 2005-102263 | 4/2005 |
| JP | 2005-215495 | 8/2005 |
| JP | 2005-341416 A | 12/2005 |
| JP | 2009-253717 A | 10/2009 |
| JP | 2012-50041 A | 3/2012 |
| JP | 2013-106239 A | 5/2013 |
| JP | 2013-232861 A | 11/2013 |
| KR | 10 2010 0065857 | 6/2012 |
| KR | 10-2012-0065857 | 6/2012 |
| RU | 2 350 036 C2 | 3/2009 |
| RU | 2011 151 852 A | 6/2013 |

OTHER PUBLICATIONS

Office Action dated May 11, 2016 in Korean Patent Application No. 10-2015-0118048 (with English language translation).
Combined Russian Office Action and Search Report dated Dec. 20, 2016 in Patent Application No. 2015135531 (with English language translation).
Office Action dated Nov. 10, 2016 in Korean Patent Application No. 10-2015-0118048 (with English translation).
Office Action issued in Korean Patent Application No. 10-2015-0118048 dated May 19, 2017 with English Translation.
Office Action issued in Japanese Patent Application No. 2014-169658 dated Apr. 17, 2018, 4pages.
Office Action issued in Japanese Patent Application No. 2014-169658 dated Jun. 26, 2018, 4 pages.

* cited by examiner

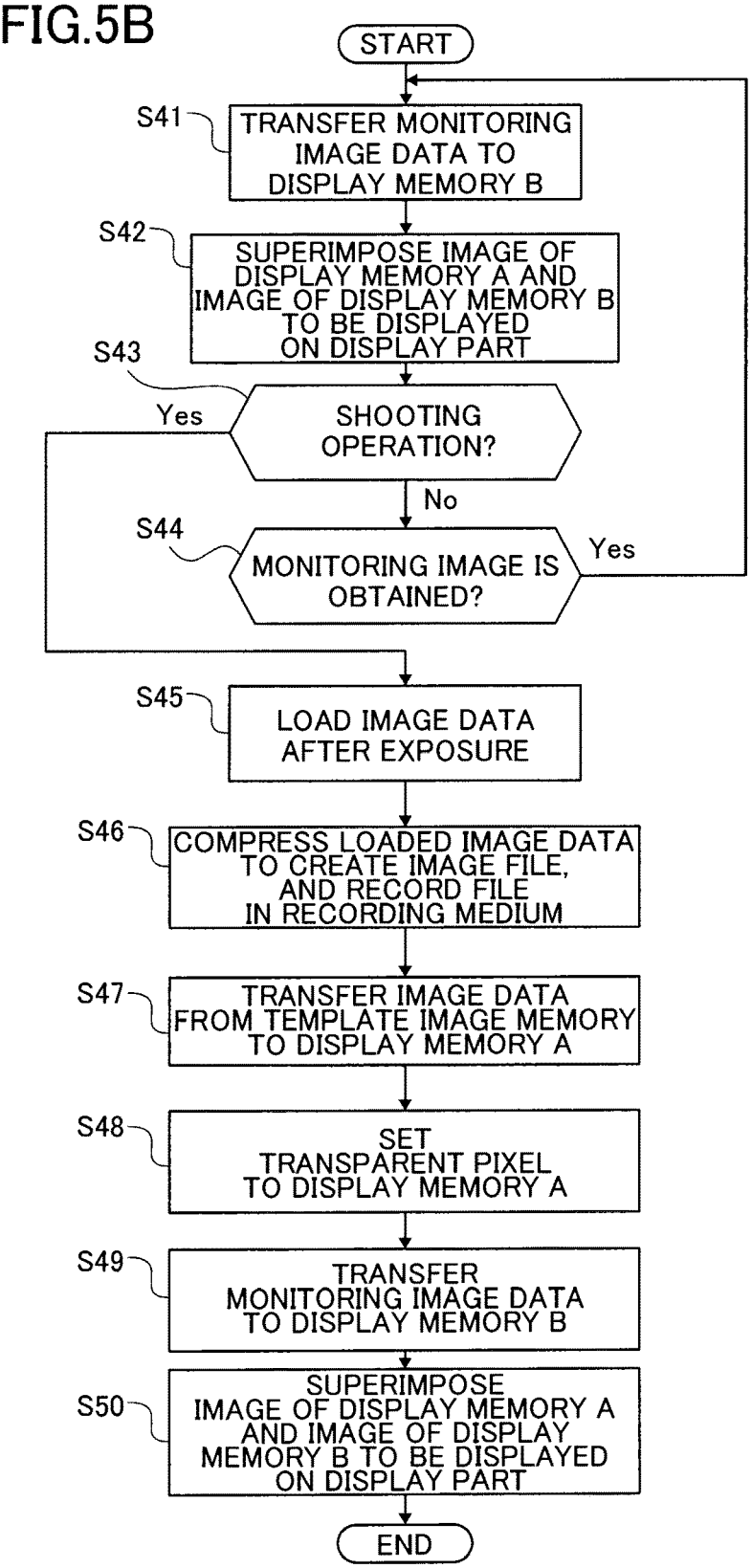

US 10,462,371 B2

IMAGING APPARATUS AND IMAGING METHOD FOR COMPARING A TEMPLATE IMAGE WITH A MONITORING IMAGE

CROSS-REFERENCE TO RELATED APPLICATION

The present application is based on and claims priority from Japanese Patent Application Number 2014-169658, filed Aug. 22, 2014, the disclosure of which is hereby incorporated by reference herein in its entirety.

BACKGROUND

Field of the Invention

The present invention relates to an imaging apparatus such as a digital still camera and a digital video camera and an imaging method.

Description of the Related Art

A time-varying subject, for example, a progress of a building under construction and a seasonally-varying landscape is shot in chronological order and the images of such a time-varying subject are compared by using an imaging apparatus such as a digital still camera. In this case, it is preferable to chronologically compare images shot at the same angle and distance. However, it is difficult to locate an imaging apparatus in the same position at all times and it is also difficult to shoot a subject at the same angle and distance at all times since the angle is determined based on feeling of a photographer.

An imaging apparatus that previously shoots an image and superimposes the previously shot image and a monitoring subject image to be displayed for determining an angle of shooting is disclosed by Patent Document 1 (Japanese Patent Publication No. 4059241). When taking a ceremonial picture with this imaging apparatus, a subject is previously shot for previously determining a composition. After that, it can be requested to the third person to shoot a picture at an angle the same as that of the previous shooting. The invention disclosed by Patent Document 1 aims to achieve actual shooting consistent with an intention of a client regardless of a shooting technique of the third person or a shooting interval.

However, the invention disclosed by Patent Document 1 uses an image shot just before actual shooting for determining the angle, and does not use past image data for current shooting. Since the previously shot image is overwritten to be deleted after actual shooting, the shooting cannot be performed many times with the same previously shot image. For this reason, an already shot image cannot be compared with a subject image to be photographed, and a time-varying subject cannot be shot at an angle the same as that of the past image.

SUMMARY

The present invention has been made in view of the above circumstances and an object of the present invention is to provide an imaging apparatus capable of easily comparing a shot image and a subject image in monitoring.

To achieve the above object, an aspect of the present invention provides an imaging apparatus that records a subject image shot by an imaging device in a recording medium as image data. The apparatus including a display that displays the image data and a selector that selects predetermined image data from the recording medium, wherein the display displays an image corresponding to the image data selected by the selector and a subject image in monitoring.

BRIEF DESCRIPTION OF THE DRAWINGS

FIG. 1A illustrates a front view of the imaging apparatus, FIG. 1B illustrates a back view of the imaging apparatus, FIG. 5B is a flowchart showing the see-through shooting processing when "shooting image" is selected in the imaging apparatus according to Embodiment 1.

DETAILED DESCRIPTION

Hereinafter, an imaging apparatus and an imaging method according to embodiments of the present invention will be described with reference to the drawings.

Embodiment 1

Figure 1A:
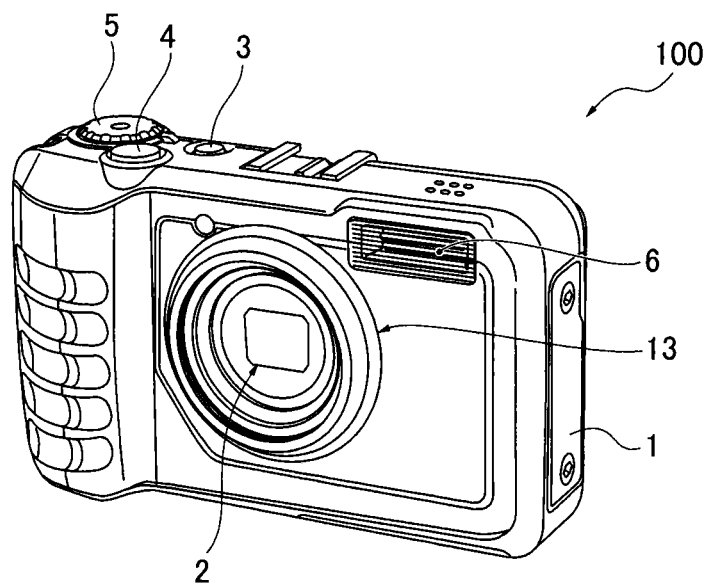
FIGS. 1A and 1B are perspective views each illustrating an imaging apparatus according to Embodiment 1 of the present invention.
Figure 1B:
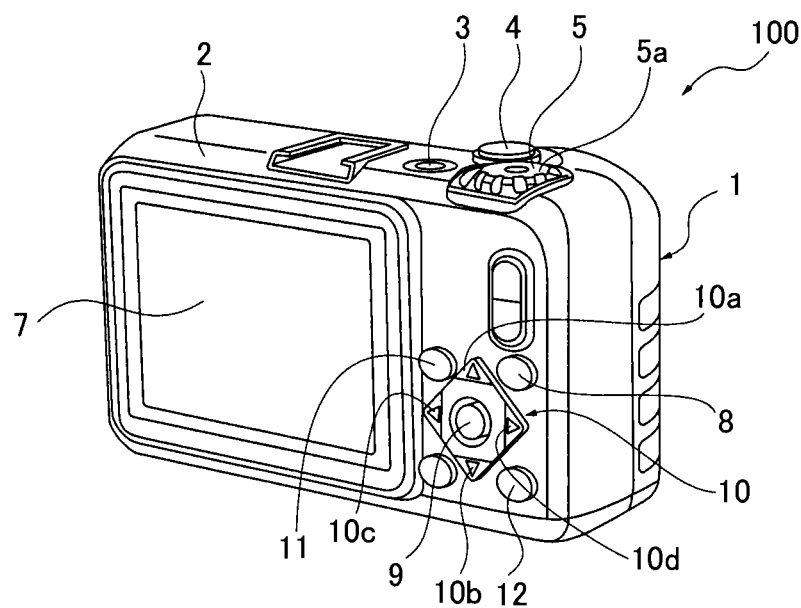

The configuration of the imaging apparatus according to Embodiment 1 of the present invention will be described with reference to FIGS. 1A, 1B, and 2. As illustrated in FIGS. 1A and 1B, an imaging apparatus 100 according to Embodiment 1 of the present invention includes a casing 1 having a front face (subject side), a top face, and a back face. The front face of the casing 1 includes a shooting lens 2. The top face of the casing 1 includes a power source button 3 for an ON and OFF operation of a power source, a shutter button 4 for a shooting operation of a subject, a mode switching dial 5 for switching a shooting mode, and a strobe 6.

The mode switching dial 5 is used for switching various shooting modes (still image mode, motion picture mode, scene mode, and the like) by turning a central axis as a rotation axis. Mode marks 5a (refer to FIG. 7) corresponding to the respective shooting modes are presented on the surface of the mode switching dial 5 in a circumference direction. A user can switch the shooting mode to a desired shooting mode by turning the mode switching dial 5 to align the mode mark 5a with a mark.

The scene mode which is one of the shooting modes includes a portrait mode that images a person and a mode that images a night view. The imaging apparatus 100 according to Embodiment 1 of the present invention includes a mode that superimposes a shot image (hereinafter referred to as a template image) and a pre-shooting subject image in monitoring (hereinafter referred to as monitoring image) to be displayed, and shoots a subject while comparing these images. In this shooting mode, transparence processing is performed to the template image data so as to see the monitoring image through the template image. This shooting mode is therefore referred to as a see-through shooting mode.

As illustrated in FIG. 1B, the back face of the casing 1 includes a display part 7 and various operation buttons. The operation buttons include a reproduction button 8 for displaying (reproducing) image data on the display part 7, a menu and OK button 9 for displaying a shooting setting menu screen and performing a determination operation, a direction instruction button 10 for instructing vertical and horizontal directions on the screen, an ADJ button 11 for displaying a template image and changing an aperture value, and a DISP button 12 for changing display of a screen. The direction instruction button 10 includes an up button 10a, down button 10b, left button 10c, and right button 10d for instructing the vertical and horizontal directions.

The display part 7 includes a liquid crystal display, and displays a display image based on monitoring image data which is pre-shooting image data, imaged image data, and image data recorded in a recording medium.

A room for loading a battery and a memory card such as an SD memory card is provided in a bottom portion of the casing 1. The imaging apparatus 100 includes an internal memory such as a flash memory to record programs and image data. Power is supplied to each section of the imaging apparatus 100 from a battery to execute each operation.

Figure 2:
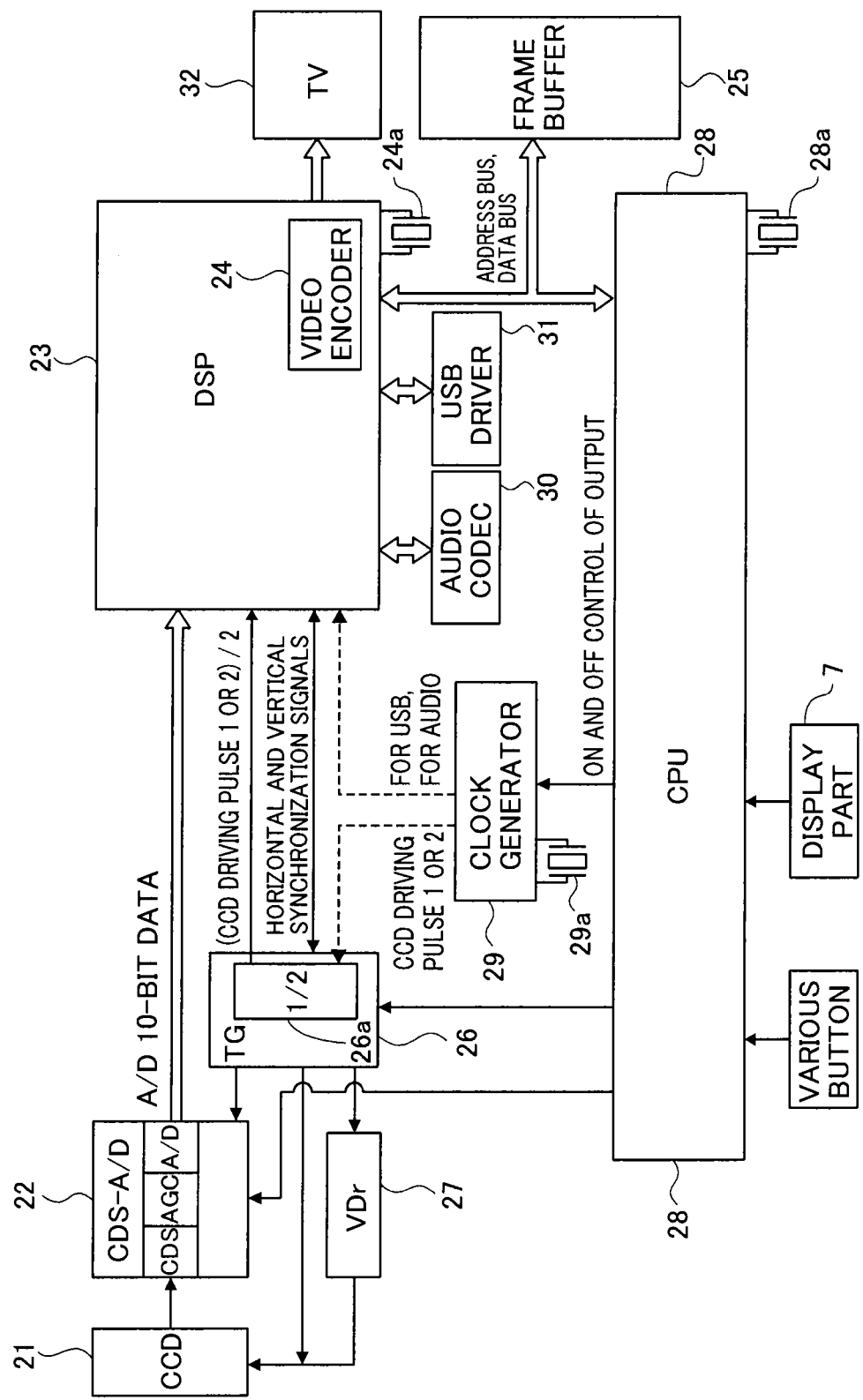
FIG. 2 is a block diagram showing a configuration of the imaging apparatus according to Embodiment 1.

The imaging apparatus 100 includes a CCD (Charged Coupled Diode) 21 as an imaging device, sampling (CDS) and analogue-digital (A/D) converter (CDS and A/D converter) 22, DSP (Digital Signal Processor) 23, video encoder 24, crystal oscillator 24a for driving a video encoder, frame buffer 25 as a recording medium (recorder), timing generator (TG) 26, vertical driver (VDr) 27, central processing unit (CPU) 28 as a controller, crystal oscillator 28a for driving a CUP, clock generator 29, crystal oscillator 29a for driving a CCD, audio codec 30, and USB driver 31, as illustrated in FIG. 2. These are mutually connected via bus lines.

The CPU 28 controls the entire operation of the imaging apparatus 100 by using a RAM as a work memory in accordance with an imaging program stored in a ROM to achieve various operations. The CPU 28 as the controller operates as a display that displays an image on the display part 7, a selector (template image selector) that selects image data as the template image from the recording medium, a shooting unit that performs shooting, and a see-through shooting unit when performing see-through shooting. The CUP 28 is connected to the shooting lens 2, power source button 3, shutter button 4, mode switching dial 5, strobe 6, display part 7, reproduction button 8, menu and OK button 9, direction instruction button 10, ADJ button 11, and DISP button 12 via control circuits or drivers. The CUP 28 controls these, and performs various processing in accordance with instructions input by the various buttons or dials.

In this embodiment, an SD memory card or an internal memory is used as the recording medium. However, the recording medium is not limited thereto. Another memory card, memory stick, or HDD connected via an USB can be used as the recording medium. The solid state imaging element is not limited to the CCD 21. For example, CMOS can be used.

In the imaging apparatus 100 as described above, light received by the CCD 21 via the shooting lens 2 from a subject is photoelectrically converted by the CCD 21, and is sent to the CDS and A/D converter 22. The CDS and A/D converter 22 correlation double samples the output signals of the CCD 21 while eliminating noise component, sequentially converts the signals into 10-bit data, and sends the 10-bit data to the DSP 23.

The DSP 23 performs various processing such as interpolation processing, aperture emphasizing processing, and white balance processing to the signals sent from the CDS and A/D converter 22, and converts the signals into a brightness signal Y and color difference signals Cb and Cr to be temporarily stored in the frame buffer 25. This operation is repeated in monitoring. The data accumulated in the frame buffer 25 is sequentially read by the video encoder 24 in the DSP 23, and converted into the video signals by the video encoder 24. The video signals are then output to the display part 7 or a display device 32 such as an external TV.

The CCD 21 is driven by a horizontal driving pulse output from the TG 26 to the CCD 21, a vertical driving pulse output from the VDr 27 to the CCD 21, and an electric shutter pulse. The CPU 28 controls the TG 26, CDS and A/D converter 22, and clock generator 29 by the electric shutter pulse. Owing to such control by the CPU 28, the TG 26 outputs a pulse for vertical driving the CCD 21 to the VDr 27, and outputs a clock to the CDS and A/D converter 22.

The original signal of the TG 26 is the pulse for driving the CCD (hereinafter referred to as CCD driving pulse) output from the clock generator 29. The CCD driving pulse is divided by a frequency divider 26a in the TG 26, and is sent to the DSP 23. On the other hand, a counter that counts the CCD driving pulse from the TG 26 is built in the DSP 23. The DSP 23 outputs a horizontal reset signal and a vertical reset signal to the TG 26 when the count number of the counter reaches a predetermined count number.

The CCD driving pulse is output from the clock generator 29. This is because a circuit that divides a clock of an oscillation frequency of the crystal oscillator 29a attached to the clock generator 29 can be simply built in the clock generator 29. By dividing the CCD driving pulse, the power for monitoring can be saved.

In the present embodiment, the clock generator 29 selectively outputs the original signal (clock generated by crystal oscillation circuit using crystal oscillator 29a) and the clock divided by 2 by the frequency divider as the CCD driving pulse 1 or 2. A plurality of frequency dividers that divides the clock generated by the crystal oscillation circuit using the crystal oscillator 29a may be prepared. However, for the purpose of simplifying the description, since the updating speed of the frame of the monitoring is lowered in accordance with the lowering of the CCD driving pulse (low frequency), the frequency divider that divides a clock by 2 is used in view of actual use.

The significant effects of the low power consumption obtained by dividing the CCD driving pulse are the low power consumption of the logic system in the TG 26 and the low power consumption of the buffer for horizontally and vertically driving the CCD 21. When dividing the CCD driving pulse by 2, the power consumption is proportional to the dividing ratio of the frequency divider that divides the CCD driving pulse to reduce the power consumption by half. In addition, the power consumption of the CDS and A/D converter 22 is also lowered although the effect the same as that of the above block (logic system and buffer) cannot be obtained.

In this embodiment, the imaging apparatus includes a clock generator 29 that arbitrary sets an updating speed of a frame of monitoring. The CPU 28 controls the clock generator 29 to change the frequency of the clock (CCD driving pulse) from the clock generator 29 to the TG 26. When the following capability is deteriorated due to the lowering in the updating speed of the frame of the monitoring, the updating speed of the frame of the monitoring can be arbitrary determined.

Figure 3:
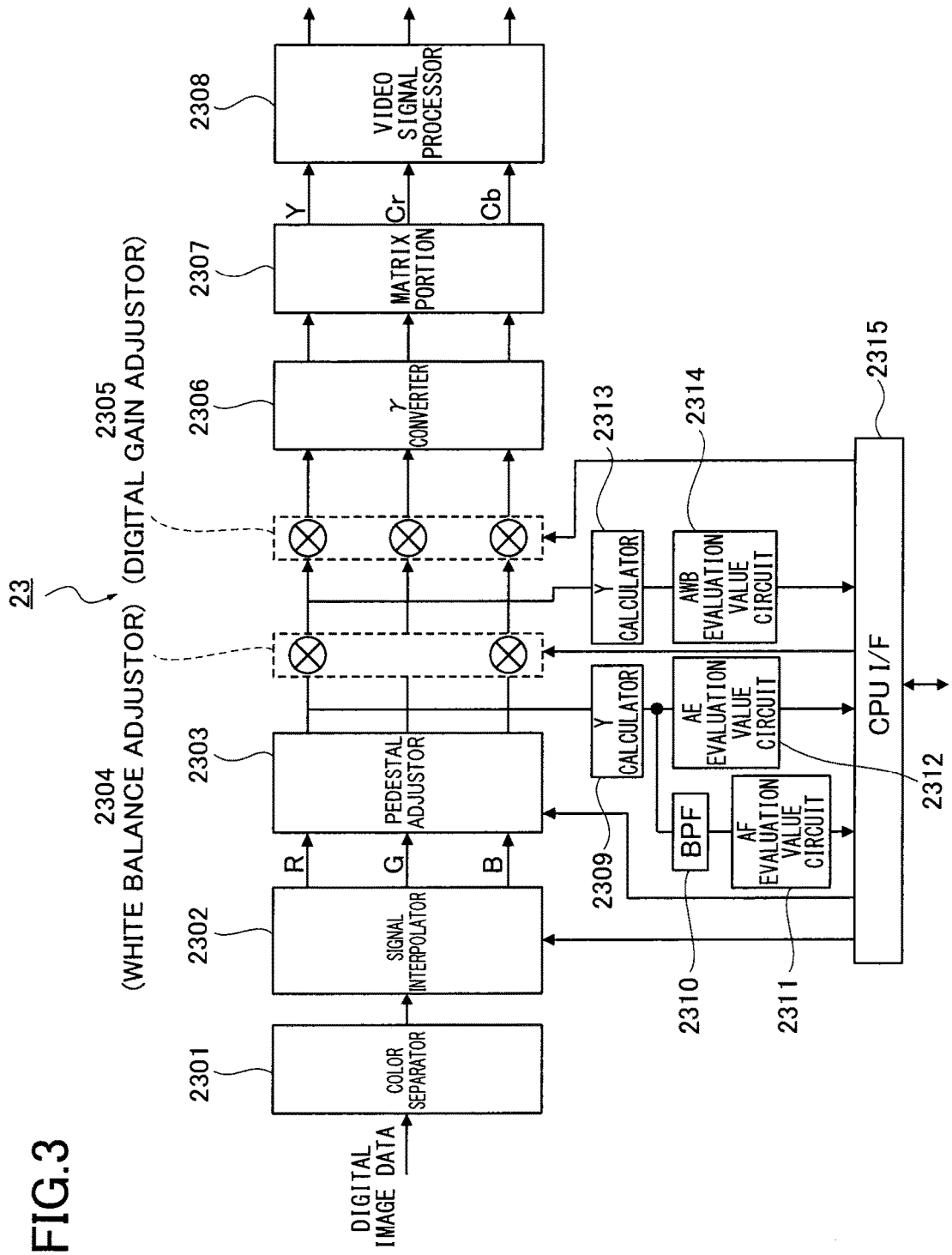
FIG. 3 is a block diagram showing a configuration of a DSP in the imaging apparatus according to Embodiment 1.

Next, one example of the configuration of the DSP 23 will be described with reference to FIG. 3. The DSP 23 includes a color separator 2301 that separates the digital image data (hereinafter referred to as image data) input from the CDS and A/D converter 22 into respective color components of R, G, and B, a signal interpolator 2302 that interpolates the respective image data of R, G, and B, a pedestal adjustor 2303 that adjusts a black level of respective image data of R. G, and B, a white balance adjuster 2304 that adjusts a white level of the respective image data of R, G, and B, a digital gain adjustor 2305 that corrects the respective image data of R, G, and B by the gain set by the CPU 28, a gamma converter 2306 that executes γ conversion of the respective image data of R, G, and B, a matrix portion 2307 that separates the respective image data of R, G, and B into the color difference signals (Cb and Cr) and the brightness signal (Y), and a video signal processor 2308 that creates a video signal based on the color difference signals (Cb and Cr) and the brightness signal (Y), and outputs to the display part 7 or the display device 32.

The DSP 23 includes a Y calculator 2309 that detects brightness data (Y) of the image data after the pedestal adjustment by the pedestal adjustor 2303, a band pass filter (BPF) 2310 that allows passage of only a predetermined frequency of the brightness data (Y) detected by the Y calculator 2309, an AF evaluation value circuit 2311 that outputs an integrated value of the brightness data (Y) passed through the BPF 2310 to the CPU 28 as an AF evaluation value, an AE evaluation value circuit 2312 that outputs the digital count value according to the brightness data (Y) detected by the Y calculator 2309 to the CPU 28 as an AE evaluation value, a Y calculator 2313 that detects the brightness data (Y) of the respective image data of R, G, and B after the adjustment by the white balance adjuster 2304, an AWB evaluation value circuit 2314 that counts the brightness data (Y) of each color detected by the Y calculator 2313 to output to the CPU 28 as an AWB evaluation value of each color, and a CPU I/F 2315 as an interface with the CPU 28.

CCD-AF (internal AF) is to detect a focused position by using the CCD 21. The CCD-AF uses a hill climbing servo method of sampling AF evaluation values showing contrasts of a subject according to image signals output from the CCD 21 by moving a focus lens system to obtain the peak position of the AF evaluation values as a focused position.

In the above-described imaging apparatus 100, when the shutter button 4 is pressed, the shooting process is started by a shooting unit, and the image data of the subject image received by a light receiving surface of the CCD 21 through the shooting lens 2 is recorded in the recording medium such as an SD memory card or an internal memory. In the imaging apparatus 100, the image based on the recorded image data is appropriately displayed on the display part 7 under the control of the CPU 28 as the display. The CPU 28 switches various shooting modes based on the signal according to the turning position of the mode switching dial 5.

Hereinafter, an operation (imaging method) that switches the shooting mode to the scene mode, and executes the see-through shooting mode in the scene mode will be described with reference to the drawings.

In Embodiment 1, before executing the shooting processing in the see-through shooting mode, the template image selecting processing to select the template image that is superimposed with the monitoring image to be displayed is executed. After that, the shooting processing (hereinafter referred to as see-through shooting processing) to superimpose the template image and the monitoring image to be displayed on the display part 7 and shoot a subject is executed.

Figure 4:
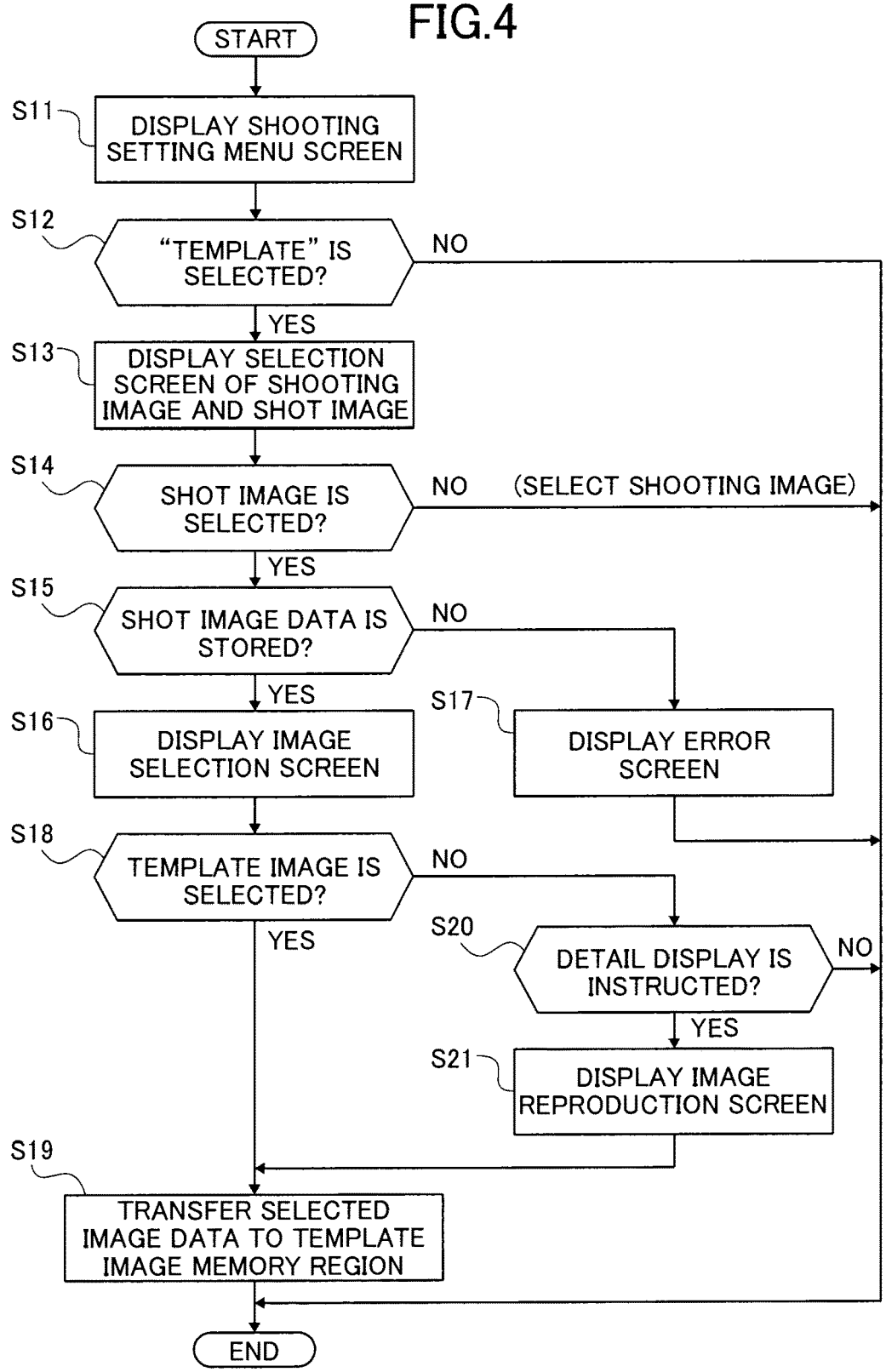
FIG. 4 is a flowchart showing template image selecting processing in the imaging apparatus according to Embodiment 1.

At first, the template image selecting processing will be described based on the flowchart in FIG. 4. The operation flow and the flow of the image to be displayed on the display part 7 will be also described with reference to the screen transition view illustrated in FIG. 6. In this case, the CPU 28 operates as the template image selector to execute the template image selecting processing.

Figure 6:
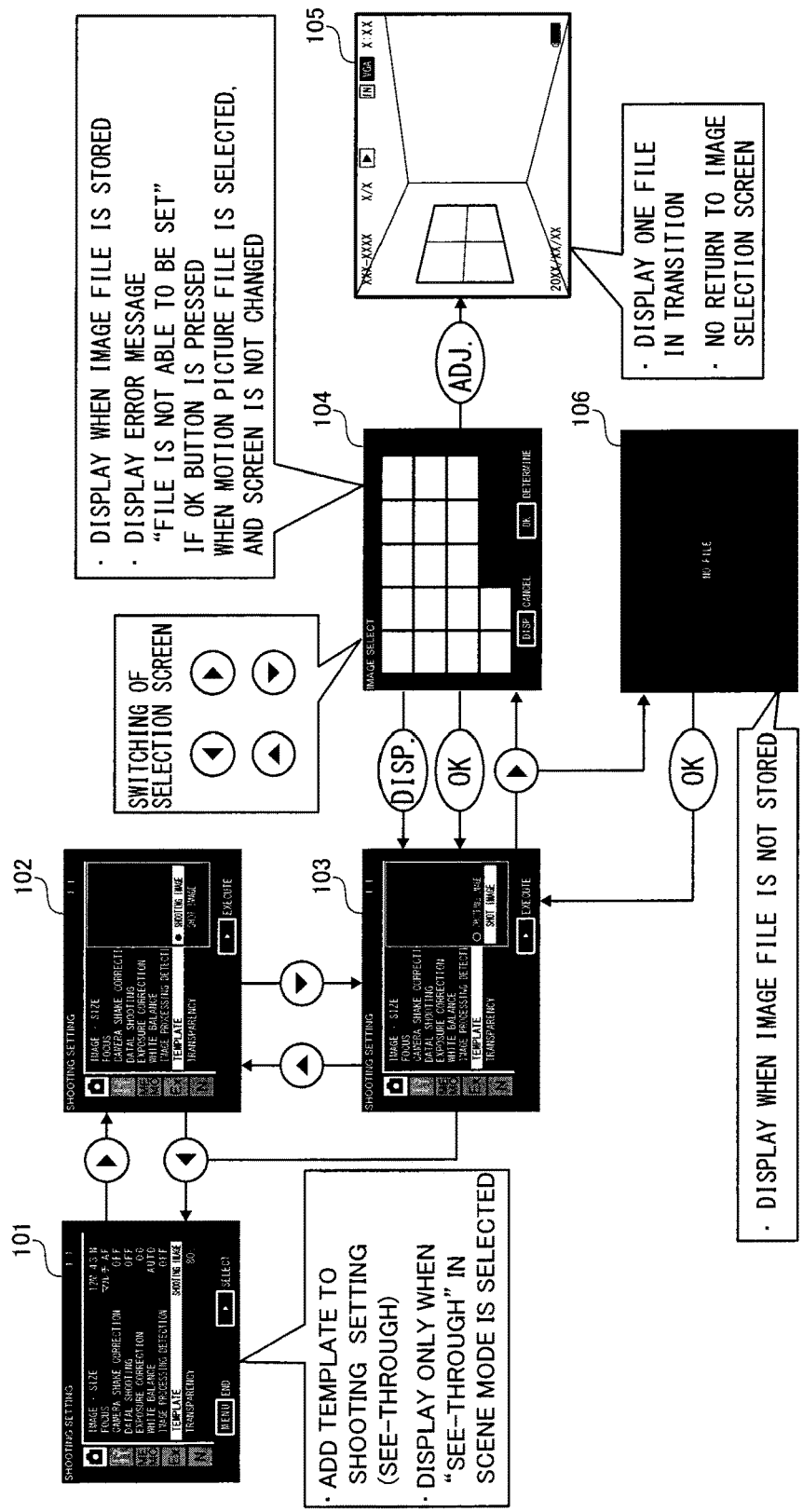
FIG. 6 is a schematic view (transition view) showing an operation flow and a screen flow in the template image selecting processing in the imaging apparatus according to Embodiment 1.

When the display of the shooting setting menu is instructed by the operation of the menu and OK button 9, the CPU 28 as the display displays a shooting setting menu screen 101 as illustrated in FIG. 6 on the display part 7 such as a liquid crystal display (S11).

When "template" is selected on the shooting setting menu screen 101 (Yes in Step 12), the template image selecting processing by the template image selector is started. In the template image selecting processing, items of "shooting image" and "shot image" are displayed on selection screens 102 and 103 displayed on the display part 7 (Step 13). More specifically, after the user points a cursor to "template" on the shooting setting menu screen 101 by operating the up button 10a or the down button 10b of the direction instruction button 10, when the user operates the right button 10d, "template" is selected. On the other hand, when "template" is not selected (NO in Step 12), the template image selecting processing is completed.

"Shooting image" is selected on the selection screen 102 and "shot image" is selected on the selection screen 103. When selecting the template image, the user can select the two items of "shooting image" and "shot image" by operating the up button 10a or the down button 10b. In the template image selecting processing, the selection screen 102 for "shooting image" and the selection screen 103 for "shot image" are alternately displayed in response to the operation of the up button 10a or the down button 10b.

Next, it is determined that whether "shot image" or "shooting image" is selected (Step 14). More specifically, it is determined that "shot image" is selected when the right button 10d is operated while the selection screen 103 is displayed. It is determined that "shooting image" is selected when the right button 10d is operated while the selection screen 102 is displayed.

When "shot image" is selected (Yes in Step 14), the processing proceeds to Step 15. On the other hand, when "shooting image" is selected (No in Step 14), an image to be shot is used as the template image. Thus, the selection screen 102 returns to the shooting setting menu screen 101 and the template image selecting processing is completed without selecting the template image.

When "shot image" is selected in Step 14, it is determined whether or not the recorded image data is stored in the recording medium such as an SD memory card or an internal memory in Step 15. When the image data is stored in the recording medium (Yes in Step 15), the recorded image data is read from the recording medium and an image selection screen 104 on which 20 reduced images corresponding to the image data are displayed is displayed on the display part 7 (Step 16). The user operates the direction instruction button 10 (10*a* to 10*d*) in the vertical and horizontal directions to switch a selection image and to select an image for the template image from the list of the images.

On the other hand, when the recorded image data file is not stored in the recording medium (NO in Step 15), an error screen 106 showing "no file" is displayed on the display part 7 (Step 17). When the user presses the menu and OK button 9 while the error screen 106 is displayed, the selection screen 103 is displayed, and the template image selecting process is completed. In this case, the user can stop the processing or the user can use "shooting image" as the template image after returning the screen to the selection screen 102 of "shooting image" by operating the up button 10*a*.

When the user points the cursor to a predetermined image on the image selection screen 104 displayed in Step 16 and operates the menu and OK button 9, the user can select that image as the template image. When the template image is selected by this operation (Yes in Step 18), the image data of the selected image is transferred (loaded) to a recording region (hereinafter referred to as template image memory) established in the RAM (Step 19), and the image selection screen 104 returns to the shooting setting menu screen 101 to complete the template image selecting processing.

In addition, when the transferring of the image data is completed, the screen 104 returns to the selection screen 103. The user can reperform the selection of the template image on the selection screen 103 by operating the direction instruction button 10. After the screen returns to the selection screen 102 for "shooting image" or the shooting setting menu screen 101, the user can reoperate on each screen.

When the template image is not selected on a predetermined image on the image selection screen 104 by the operation of the menu and OK button 9 (No in Step 18), the ADJ button 11 is operated. With this operation, it is determined that detail display is instructed (Yes in Step 20) and one of the images (reproduction image 105) is displayed (reproduced) (Step 21). The user can therefore confirm the details of the image. After that, the image is transferred to the template image memory as the template image data (Step 19) and the template image selecting processing is completed. When the detail display is not instructed (No in Step 20), the template image selecting processing is completed.

Next, the see-through shooting processing in the see-through shooting mode will be described with reference to the flowcharts in FIGS. 5A and 5B. The operation flow by the user and the flow of the images to be displayed on the display part 7 are also described with reference to the transition view in FIG. 7. In this case, the CPU 28 operates as the see-through shooting unit to execute the see-through shooting processing.

Figure 7:
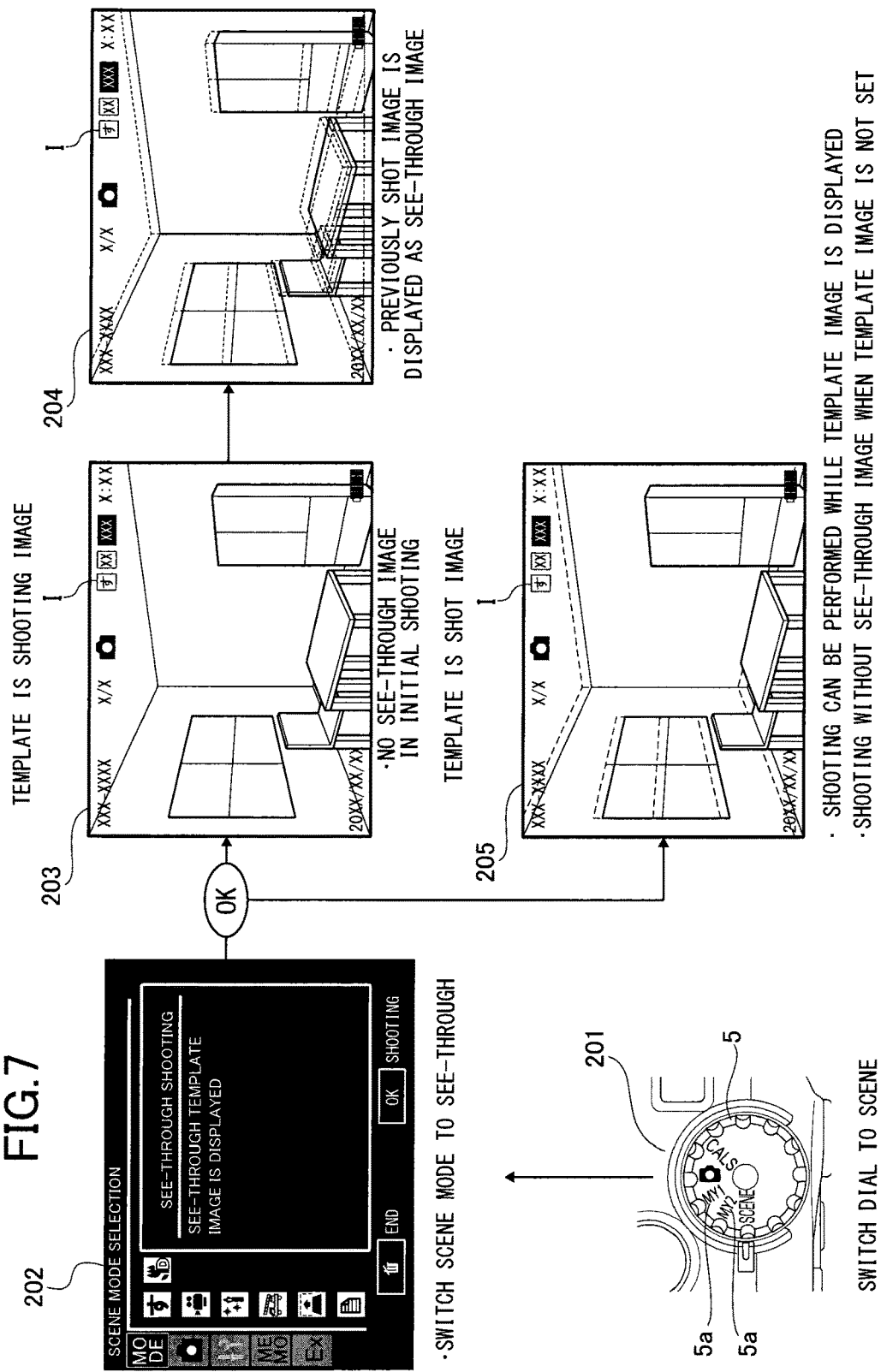
FIG. 7 is a schematic view (transition view) showing an operation flow and a screen flow in see-through shooing in the imaging apparatus according to Embodiment 1.

When the user switches the mode switching dial 5 to "SCENE" (scene mode) as illustrated by 201 in FIG. 7 for the see-through shooting, the display displays a scene mode selection screen 202. When the see-through shooting mode is selected on the scene mode selection screen 202, a message "see-through template image is displayed" is displayed on the scene mode selection screen 202. When the user operates the menu and OK button 9, the see-through shooting processing is started by the see-through shooting unit.

The see-through shooting processing when "shot image" is selected by the previously executed template image selecting processing will be described with reference to the flowchart in FIG. 5A. As illustrated in FIG. 5A, when "shot image" is selected, the template image data recorded in the template image memory is transferred to a recording region (hereinafter referred to as display memory A) established in the RAM in the see-through shooting processing (Step 31). Next, a predetermined transparent pixel is set to the display memory A (Step 32) to see the monitoring image in a display memory B through the template image. Since a typical method of superimposing can be used for the see-through display method, the detailed description thereof will be omitted.

Next, the data of the subject image (hereinafter referred to as monitoring image) loaded by the CCD 21 is transferred to the display memory B (Step 33). As illustrated in FIG. 7, an image 205 in which the template image of the display memory A and the monitoring image of the display memory B are superimposed is displayed on the display part 7 (Step 34). An icon I showing "see-through shooting" being in execution is displayed in the upper part of the image 205.

The images by the solid lines are the monitoring images and the images by the dotted lines are the template images (see-through images) in the image 205. The user can easily compare the monitoring images and the template images on this display. Thus, the template image and the monitoring image are aligned to set an angle the same as that in the shooting of the template image.

The monitoring images are periodically obtained by the CCD 21, and the monitoring image data are transferred. Therefore, while the shooting operation is not executed (NO in Step 35), Steps 33 and 34 are repeated to update the monitoring image to be displayed on the display part 7 every time a new monitoring image is obtained (YES in Step 36). When the monitoring image is obtained with a typical period of 33 msec, the transfer speed is 30 fps.

When the user performs shooting by pressing the shutter button 4 (Yes in Step 35), the processing proceeds to a process after shooting from the loop process for monitoring. In this processing, the image data of the still image is loaded after the exposure of CCD 21 is completed (Step 37). The loaded image data is compressed by JPEG to create a file of an Exif format and the file is recorded in the recording medium as the image data file (Step 38).

When recording the image data file, the still image and the template image are not synthesized. The template image is used only for the superimposing display in monitoring, and is not used for the image file of the still image.

Although the imaging processing is executed as described above, the processes of Steps 31 to 38 are repeated until the see-through shooting is completed by the user.

Next, the see-through shooting process when "shooting image" is selected by the template image selecting process will be described with reference to the flowchart in FIG. 5B. As illustrated in FIG. 5B, when "shooting image" is selected, the data of the monitoring image is transferred to a recording region (hereinafter referred to as display memory B) established in the RAM by the CCD 21 (Step 41). Next, the image 205 in which the template image of the display memory A and the monitoring image of the display memory B are superimposed is displayed on the display part 7. In this case, when the shooting has been never performed, the image data is not stored in the display memory A. Thus, all of the initial values of the display memory A are set to be transparent. A normal monitoring image is thereby displayed even when the superimposing display is executed. More specifically, as illustrated in FIG. 7, an image 203 showing the monitoring image is only displayed on the display part 7. The icon I showing "see-through shooting" being in execution is displayed in the upper part of the image 203.

Similar to the selection of "shot image" as described above, while the shooting operation is not performed (No in Step 43), Steps 41 and 42 are repeated to update the monitoring image to be displayed on the display part 7 every time a new monitoring image is obtained (Yes in Step 44).

When the user performs the shooting by pressing the shutter button 4 (Yes in Step 43), the processing proceeds to a process after shooting from the loop process for monitoring. In this process, the image data of the still image after the exposure is loaded (Step 45), the image data is compressed to create the image file, and the image file is recoded in the recording medium (Step 46). In this case, the template image is not synthesized to be recorded. In Step 46, the shot image data is recoded in the template image memory.

After the shooting is completed, the monitoring image is displayed on the display part 7. The previously shot image is obtained by this shooting and the previously shot image is used as the template image. Consequently, an image 204 in which the template image and the monitoring image are superimposed is displayed as illustrated in FIG. 7. The images by the solid lines are the monitoring images and the images by the dotted lines are the template images in the image 204.

For superimposing the images, the previously shot image is transferred to the display memory A from the template image memory (Step 47), and the transparent pixel is set to the display memory A (Step 48). After that, the data of the monitoring image is transferred to the display memory B (Step 48), the image 204 in which the template image and the monitoring image are superimposed is displayed on the display part 7 as illustrated in FIG. 7 (Step 50).

After that, the user performs the see-through shooting by using the template image. In this case, the see-through shooting in which the monitoring image and the template image are superimposed can be repeated by repeating the processes of Steps 43 to 48.

As described above, in the imaging apparatus 100 according to Embodiment 1, the template image by the shot image or the previously shot image can be easily compared with the monitoring image. A plurality of images is therefore shot in chronological order at the same angle, and the subject image can be easily evaluated in chronological order. More specifically, when shooting a progress of a building under construction in a building site in the same background, the building can be shot in chronological order at the same angle and in the same distance by using the template image for the background image. The progress can be therefore easily confirmed. As another example, a building before reforming and a building after reforming can be shot at the same angle, and the buildings before and after reforming can be easily compared.

When "shooting image" is selected as the template image, the previously shot image is displayed as the template image. It can be therefore immediately recognized that a subject is not filled in the frame or the eyes of the subject are closed. The subject can be easily reshot at the same angle while comparing the template image and the monitoring image.

In the imaging apparatus 100 according to Embodiment 1, the template image can be selected from "shooting image" and "shot image". However, the present invention is not limited thereto. The present invention can be achieved as long as the template image can be selected from the shot image. In this case, the processing shown by the flowchart in FIG. 5B is omitted, and the display of the selection screen 102 in FIG. 6 is also omitted. Thus, the configuration of the imaging apparatus 100 can be simplified.

In a case that "shooting image" is used as the template image, just after the see-through shooting is performed by the operation of the shutter button 4, when the shooting mode is changed by the operation of the mode switching dial 5, the see-through shooting is released and the monitoring image is only displayed on the display part 7. When the power source is turned off, the data of the template image memory is deleted. On the other hand, when the power source is not turned off and the see-through shooting is again selected, the previously shot image is superimposed with the monitoring image as the template image to be displayed.

When executing the see-through shooting, if an enlargement function is operated, an angle is changed. For this reason, it is preferable to release the see-through shooting mode in the operation of the enlargement function. When the enlargement function is released, the see-through shooting mode can be started. Even when a shooting angle is changed by the rotation of the imaging apparatus 100, the template image can be displayed in the correct position regardless of the rotation information. In this case, the user can shoot a subject at the same angle by rotating the imaging apparatus 100 to the correct position. Even when the imaging apparatus 100 shoots a subject while being rotated, the normal shooting can be performed since the template image is not used for the image file.

When "shot image" is selected in the previous shooting, the template image memory may be checked upon a transition to the see-through shooting mode by this shooting. When the data is stored, the display on the display part 7 can be performed by using the template image. When the data is deleted, the mode can be changed to the mode for "shooting image" which does not designate the template image.

Embodiment 2

Next, an imaging apparatus according to Embodiment 2 of the present invention will be described. Since the imaging apparatus according to Embodiment 2 includes a basic configuration the same as that of the imaging apparatus 100 according to Embodiment 1 except that the imaging apparatus according to Embodiment 2 includes a transparency setting unit, the detailed description thereof will be omitted. In this embodiment, the CPU 28 as the controller operates as the transparency setting unit to execute a transparency setting process.

Figure 8:
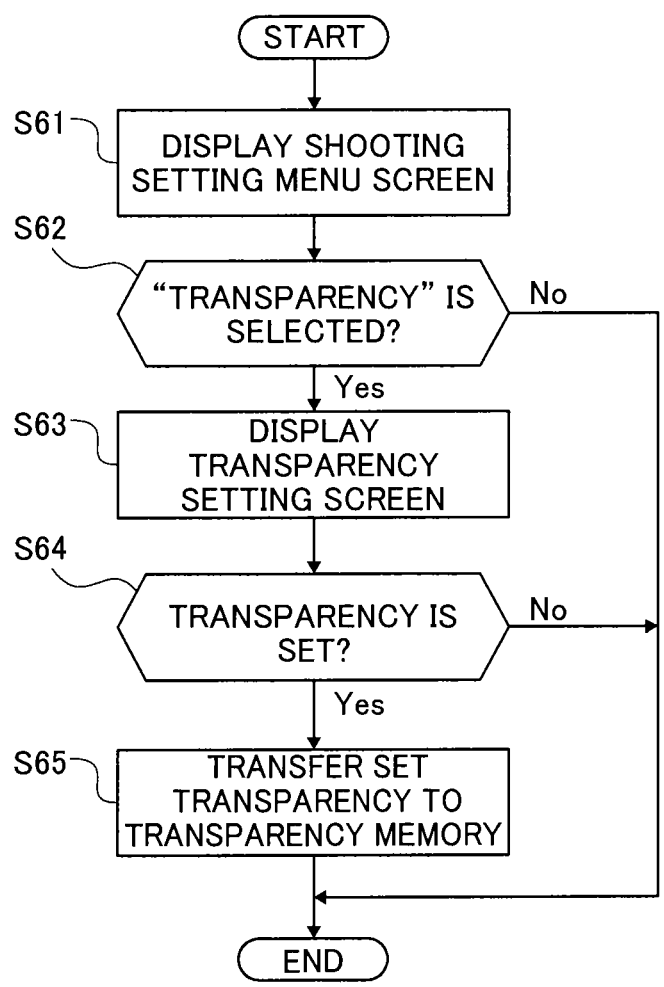
FIG. 8 is a flowchart showing a transparency setting process in an imaging apparatus according to Embodiment 2 of the present invention.

The transparency setting process by the transparency setting unit will be described with reference to the flowchart in FIG. 8 and the transition view in FIG. 9. The transparency setting process may be executed before and after the template image selecting processing as long as it is executed before the see-through shooting processing.

Figure 9:
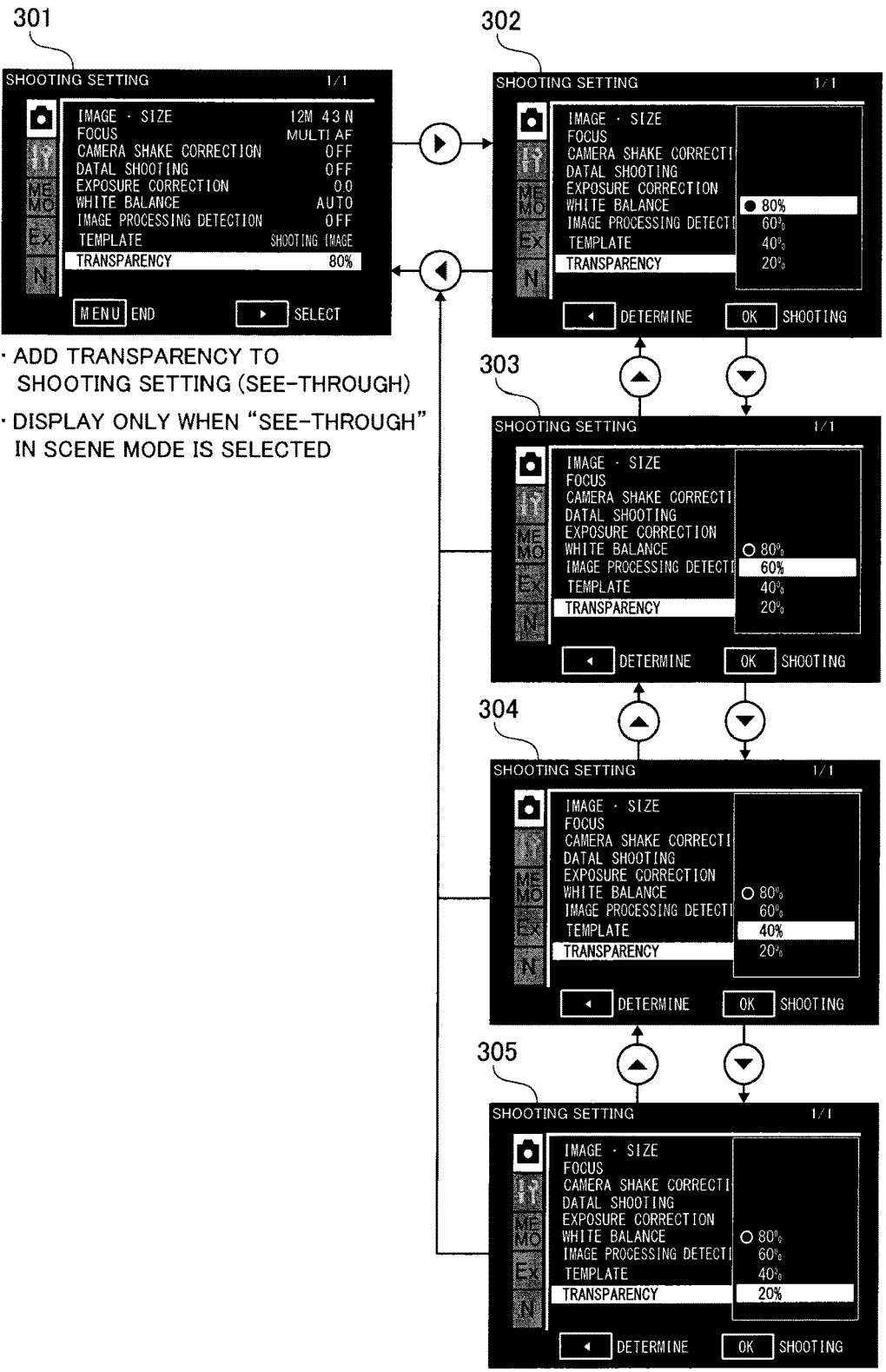
FIG. 9 is a schematic view (transition view) showing an operation flow and a screen flow in the transparency setting process in the imaging apparatus according to Embodiment 2 of the present invention.

When the display of the shooting setting menu is instructed by the operation of the menu and OK button 9, the CPU 28 displays a shooting setting menu screen 301 as illustrated in FIG. 9 on the display part 7 of the liquid crystal display (Step 61).

When "transparency" is selected on the shooting setting menu screen 301 (Yes in Step 62), the transparency setting process by the transparency setting unit is started. In the transparency setting process, as illustrated in FIG. 9, a transparency setting screen (302 to 305) on which items of transparency are displayed on the shooting setting menu screen is displayed on the display part 7. More specifically, after the user points the cursor to "transparency" on the shooting setting menu screen 301, when the user operates the right button 10d, "transparency" is selected. On the other hand, when the above operation is not performed and "transparency" is not selected (No in Step 62), the transparency setting process is completed.

When the user operates the up button 10a and the down button 10b, the transparency can be switched. The transparency setting process displays the transparency setting screens 302 to 305 according to the operation of the user. In this embodiment, the transparency can be selected from four levels such as 80% (transparency setting screen 302), 60% (transparency setting screen 303), 40% (transparency setting screen 304), and 20% (transparency setting screen 305). When the menu and OK button 9 is pressed while any one of the transparency setting screens 302 to 305 is displayed, the transparency is determined. In the transparency setting process, the determined transparency is transferred to a recording region (hereinafter referred to as transparency memory) established in the RAM (Step 65), and the transparency setting process is completed after the screen returns to the shooting setting menu screen 301.

Figure 5A:
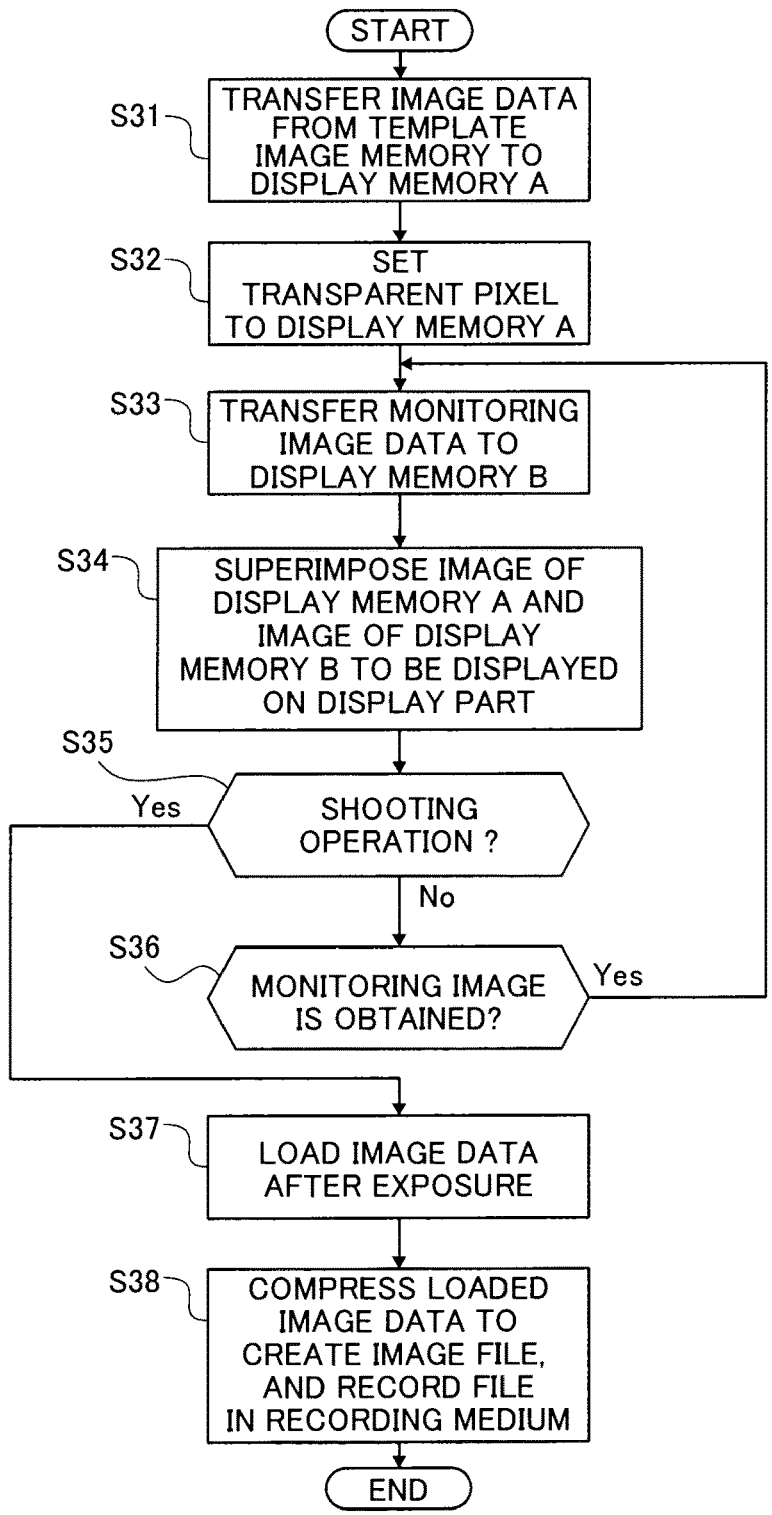
FIG. 5A is a flowchart showing see-through shooting processing when "shot image" is selected in the imaging apparatus according to Embodiment 1.

After the transparency setting process, when the see-through shooting processing is executed, processing similar to the see-through shooting processing according to Embodiment 1 described with reference to the FIGS. 5A, 5B is executed. However, when setting the transparent pixel to the display memory A of the template image in Step 32 and Step 48, the transparency that is recorded in the transparent memory and set by the transparency setting process is used.

As described above, in the imaging apparatus according to Embodiment 2, the template image by the shot image or the previously shot image can be easily compared with the monitoring image. A plurality of images can be therefore shot in chronological order at the same angle, and the subject image can be easily evaluated in chronological order. Since the transparency can be arbitrary set, the monitoring image can be easily recognized. The see-through shooting can be therefore easily performed by selecting the most suitable transparency according to a shooting environment, a color of a subject, and a shooting purpose.

Embodiment 3

Next, an imaging apparatus according to Embodiment 3 of the present invention will be described. Since the imaging apparatus according to Embodiment 3 includes a basic configuration the same as that of the imaging apparatus according to Embodiment 1 except that the imaging apparatus according to Embodiment 3 includes a canceling operation unit that cancels the superimposing display of the template image and the monitoring image, the detailed description thereof will be omitted. In this embodiment, the CPU 28 as the controller operates as the canceling operation unit to execute a canceling operation process (canceling process).

When the user half-presses the shutter button 4, the canceling operation unit cancels the superimposing display of the monitoring image and the template image. The half-pressing operation of the shutter button 4 is to execute the auto focusing (AF). The canceling operation process is executed along with the execution of the AF when the shutter button 4 is half-pressed.

Figure 10:
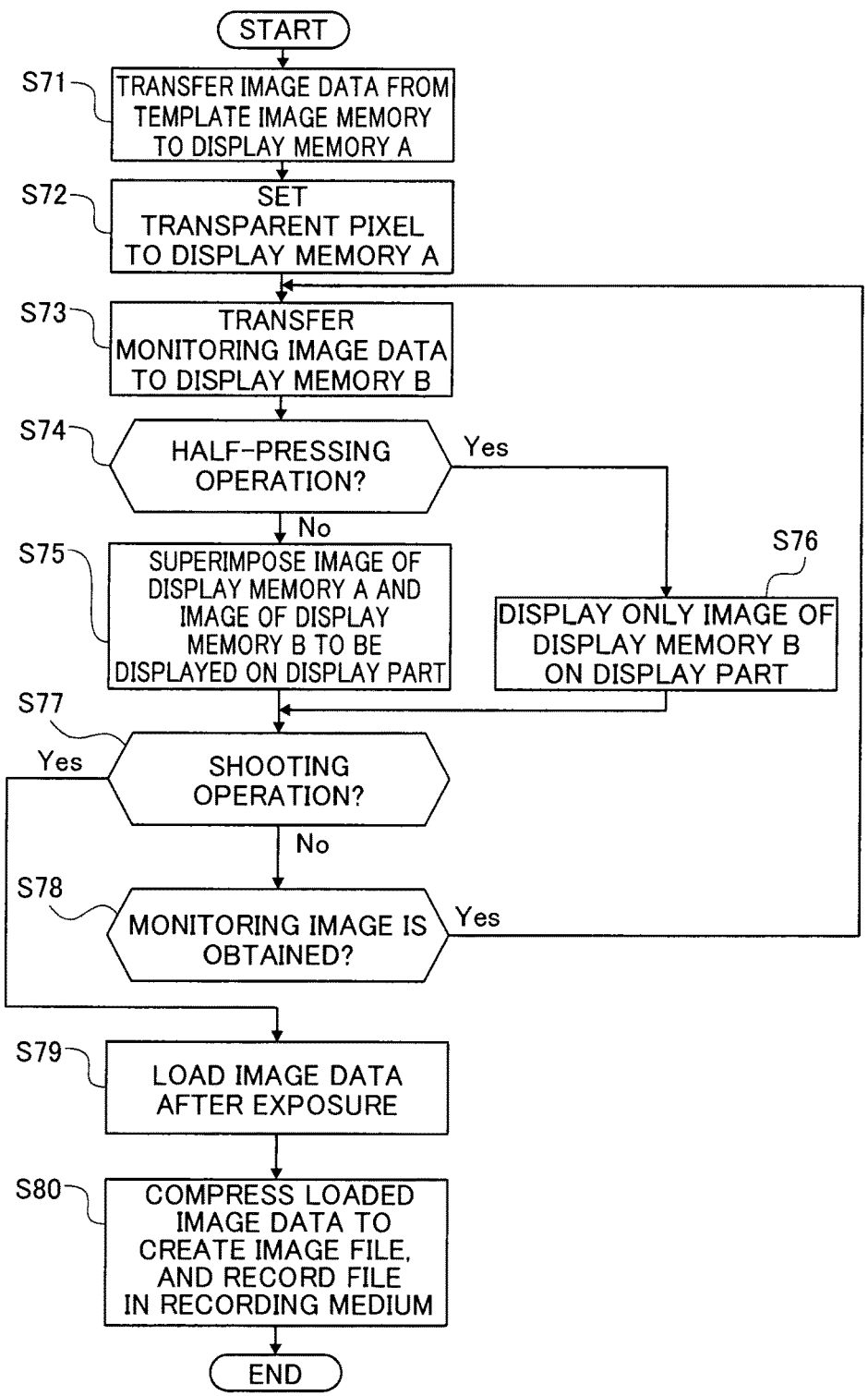
FIG. 10 is a flowchart showing see-through shooting processing in an imaging apparatus according to Embodiment 3 of the present invention.

FIG. 10 is a flowchart showing see-through shooting processing according to Embodiment 3. As illustrated in FIG. 10, since the see-through shooting processing according to Embodiment 3 is similar to the see-through shooting process according to Embodiment 1 described with reference to the flowchart in FIG. 5A except that the see-through shooting processing according to Embodiment 3 includes the canceling operation process of Steps 74 to 76, the detailed description for the processing similar to that of Embodiment 1 will be omitted.

In Embodiment 3, "shot image" is selected as the template image or is previously stored in a program as the template image. As illustrated in FIG. 10, in the see-through shooting processing according to Embodiment 3, similar to Embodiment 1, the template image data is transferred from the template image memory to the display memory A (Step 71), and a predetermined transparent pixel is set to the display memory A (Step 72). Next, the monitoring image data is transferred to the display memory B (Step 73).

Next, when the shutter button 4 is not half-pressed (No in Step 74), an image in which the template image of the display memory A and the monitoring image of the display memory B are superimposed is displayed on the display part 7 (Step 75). The image is displayed in a superimposing see-through shooting mode. On the other hand, when the shutter button 4 is half-pressed (Yes in Step 74), the display of the template image is cancelled, and the monitoring image of the display memory B is only displayed on the display part 7 (Step 76). The display of the superimposed image is thereby stopped and the normal monitoring image is displayed.

The process after that is similar to that in Embodiment 1. The monitoring image is updated until the shutter button 4 is pressed (Steps 77 and 78). When the shooting is performed by pressing the shutter button 4, the image data of the still image after the exposure is loaded (Step 79), the loaded image data is compressed by JPEG to create a file of an Exif format, and the file is recorded in the recording medium as an image data file (Step 80).

As described above, in the imaging apparatus according to Embodiment 3, the template image by the shot image or the previously shot image can be easily compared with the monitoring image. A plurality of images can be shot in chronological order at the same angle, and the subject image can be easily evaluated in chronological order. By half-pressing the shutter button 4, the display of the superimposed image is canceled to display only the monitoring image. The focusing can be therefore easily confirmed.

In Embodiment 3, "shot image" is selected or previously set as the template image. However, in the imaging apparatus according to Embodiment 3, "shot image" and "shooting image" can be selected as the template image. In this case, by the process similar to that of Embodiment 1, "shot image" and "shooting image" can be selected. The basic process of the see-through shooting processing when "shot image" is selected is the same as that of the see-through shooting processing of Embodiment 1 described with reference to the flowchart in FIG. 5B except that the see-through shooting processing according to Embodiment 3 includes the canceling operation process.

In addition, since the transparency setting unit can be provided in the imaging apparatus according to Embodiment 3, the imaging apparatus according to Embodiment 3 can perform the transparency setting process by the transparency setting unit.

According to the embodiments of the present invention, the shot image and the subject image in monitoring can be easily compared.

Although the embodiments of the present invention have been described above, the present invention is not limited thereto. It should be appreciated that variations may be made in the embodiments described by persons skilled in the art without departing from the scope of the present invention.

What is claimed is:

1. An imaging method that records an image of a subject shot by an imaging device in a recording medium as image data, the method comprising:
   displaying the image data;
   receiving a user selection of an image from among images previously captured and stored on the recording medium;
   controlling a display of a monitoring image of the subject together with the selected image after a transparency of the selected image is changed and until the monitoring image is recorded as the image data; and
   in response to a determination that a shutter button of the imaging device is half-pressed, terminating display of the selected image so that only the monitoring image is displayed, wherein the method further comprises
   displaying plural images and at least one motion picture previously captured and stored on the recording medium, and
   in response to receiving a user selection of the motion picture, displaying an error message indicating that the motion picture cannot be selected.

2. The imaging method according to claim 1, wherein the controlling includes superimposing at least a part of the monitoring image onto the selected image.

3. The imaging method according to claim/further comprising setting a transparency of the selected image.

4. The imaging method according to claim/further comprising canceling display of the selected image.

5. The imaging method according to claim 2 further comprising canceling display of the selected image.

6. An imaging apparatus that records an image of a subject shot by an imaging device in a recording medium as image data, the imaging apparatus comprising:
   circuitry configured to:
      display the image data; and
      receive a user selection of an image from among images previously captured and stored on the recording medium, wherein
   the circuitry displays the selected image and a monitoring image of the subject,
   the circuitry displays the selected image after a transparency of the selected image is changed and until the monitoring image is recorded as the image data,
   in response to a determination that a shutter button of the imaging apparatus is half-pressed, display of the selected image is terminated so that only the monitoring image is displayed,
   the circuitry displays plural images and at least one motion picture previously captured and stored on the recording medium, and
   in response to the circuitry receiving the user selection of the motion picture, the circuitry displays an error message indicating that the motion picture cannot be selected.

7. The imaging apparatus according to claim 6, wherein the circuitry is further configured to receive a user selection of a transparency level and to change the transparency of the selected image according to the selected transparency level.

8. The imaging method according to claim 1, further comprising receiving a user selection of a transparency level and changing the transparency of the selected image according to the selected transparency level.

9. The imaging apparatus according to claim 6, further comprising an interface that receives a user selection of a transparency level and changes the transparency of the selected image according to the selected transparency level.

10. The imaging apparatus according to claim 6, wherein the circuitry displays the plural images previously captured and stored on the recording medium and receives the user selection of one of the displayed images.

11. The imaging apparatus according to claim 6, wherein
   in response to a shooting operation, image data is recorded to memory and the circuitry displays the recorded image data as a selected image superimposed on a monitoring image.

12. The imaging apparatus according to claim 6, wherein the circuitry is configured to superimpose at least a part of the monitoring image onto the selected image.

13. The imaging apparatus according to claim 12, wherein the circuitry is further configured to cancel display of the selected image.

14. The imaging apparatus according to claim 6, wherein the circuitry is further configured to set a transparency of the selected image.

15. The imaging apparatus according to claim 6, wherein the circuitry is further configured to cancel display of the selected image.

* * * * *